No. 885,770. PATENTED APR. 28, 1908.
W. H. LUCAS.
METAL CUTTING SAW.
APPLICATION FILED MAY 31, 1906.
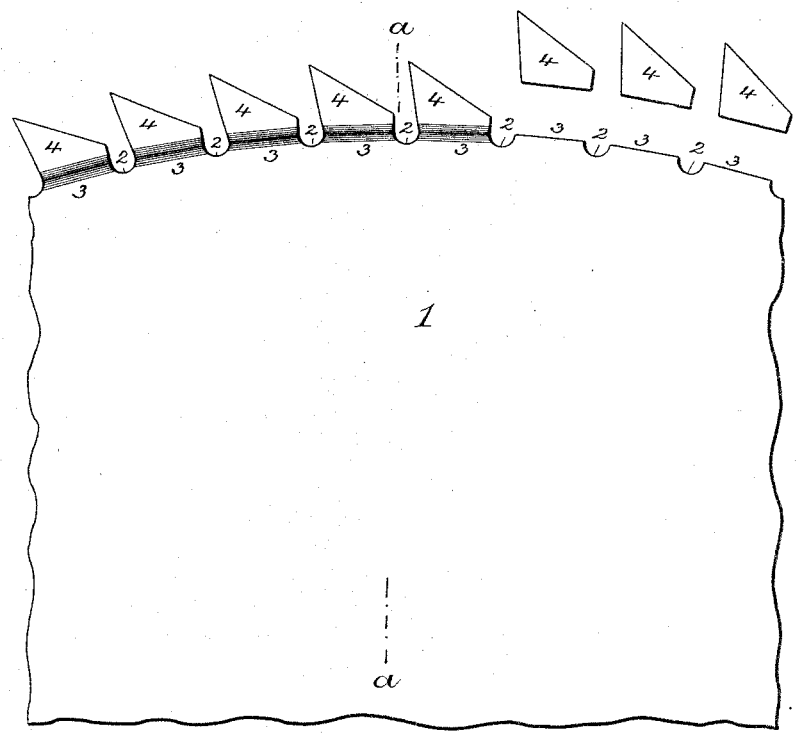
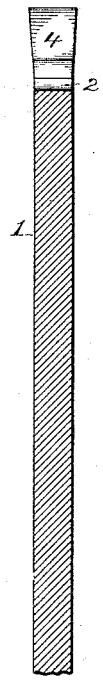
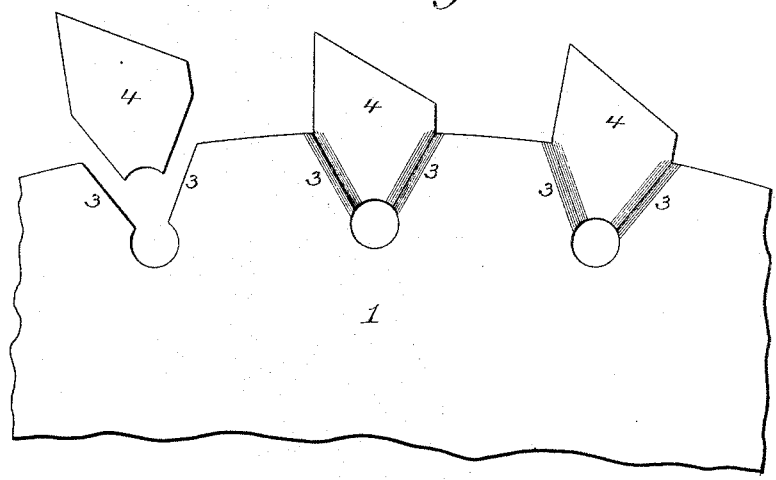
Witnesses
Hamilton T. Turner
Kate A. Beadle.
Inventor
William H. Lucas
by his Attorneys
Smith & Frazier

UNITED STATES PATENT OFFICE.

WILLIAM H. LUCAS, OF PHILADELPHIA, PENNSYLVANIA, ASSIGNOR TO ESPEN-LUCAS MACHINE WORKS, OF PHILADELPHIA, PENNSYLVANIA, A CORPORATION OF PENNSYLVANIA.

METAL-CUTTING SAW.

No. 885,770.      Specification of Letters Patent.      Patented April 28, 1908.

Application filed May 31, 1906. Serial No. 319,589.

*To all whom it may concern:*

Be it known that I, WILLIAM H. LUCAS, a citizen of the United States, residing in Philadelphia, Pennsylvania, have invented certain Improvements in Metal-Cutting Saws, of which the following is a specification.

My invention relates to that class of metal-cutting saws which have a body or blade of relatively soft steel, and cutting teeth of hardened steel, the objects of my invention being to simplify and cheapen the construction of saws of this class, and to render the same more effective than others for the performance of their intended duty. These objects I attain in the manner hereinafter set forth, reference being had to the accompanying drawing, in which Figure 1 is a view of part of a metal-cutting saw constructed in accordance with my invention, and showing some of the teeth secured in place and others detached; Fig. 2 is a transverse section on the line *a—a*, Fig. 1, and Fig. 3 is a view similar to Fig. 1 but illustrating a modification of my invention.

Prior to my invention metal-cutting saws have been composed either wholly of hardened steel, or with a blade or body of relatively soft steel, and teeth of hardened steel inserted into recesses in the tooth-carrying portion of the saw, hereinafter, for convenience, termed the "periphery". Generally these recesses must be accurately formed by milling, and must be undercut or grooved to provide for the lateral retention of the teeth or teeth-holders, and the latter must also be accurately formed in order to properly fit the recesses, hence the preparation of the saw blade and teeth is a slow, laborious and expensive operation, and, when the periphery of a saw blade of this character becomes worn or battered, the blade must be cut down to a smaller diameter and a fresh set of recesses must be formed therein.

I overcome the objections to the present practice by securing the teeth to the periphery of the saw blade by electric welding.

It is not practicable to adopt the old method of welding in order to secure teeth of hardened steel to the periphery of a saw blade composed of ordinary steel, because, if the teeth are hardened before being welded, the heat of the welding operation softens or removes the temper from the teeth to such an extent as to render them unfit for the use for which they are intended, while if it is attempted to harden the teeth after the welding operation there is a resultant buckling or distortion of the blade of the saw. I have found, however, that by providing the peripheral surface of the saw blade with specially prepared seats for the teeth, the latter, although previously hardened, can, by the use of the electric welding process, be effectively welded to the blade without impairing the quality of the cutting portions of the teeth, and I am thus enabled to produce a metal-cutting saw of high efficiency with a minimum expenditure of time and labor and hence at relatively low cost.

In preparing the periphery of the blade 1 for the reception of the teeth I first form, in said periphery, notches 2, so as to produce a succession of seats 3, each corresponding substantially in area with the area of the base of the tooth 4 which is to be secured thereto. When thus prepared, the base portion of each tooth and the seat upon which it is mounted are, in the operation of electric welding heated to a substantially uniform degree, and, as the seat presents at all points the same resistance to the inward pressure imparted to the tooth in welding, the flow of the metal is uniform throughout all portions of the base of the tooth and its seat and a perfect weld is produced, the area of intense heat extending but a comparatively short distance into the tooth and into the blade of the saw, as indicated by the shade lines in Fig. 1, hence the outer portion of each tooth remains hard, and retains all of the cutting properties due to that quality.

The teeth may have their bases inserted into recesses or notches in the blade of the saw, if the walls of the recesses and the sides of the bases of the teeth are so formed that the walls of each recess will present, at all points, the same resistance to the inward pressure of the tooth, for instance the recesses may have their opposite walls inclined at equal angles, as shown in Fig. 3, and the bases of the teeth may be correspondingly formed, the tooth bases and seats being of substantially equal area. Neither the teeth, nor the notches in the blade, however, require milling or other expensive preparation, the notches being punched and the teeth drop forged, hence this modification of the invention does not add materially to the cost of the saw.

A saw made in accordance with my invention, can, as will be evident, be much thinner than one made with inserted teeth, thereby not only lessening the initial cost of the saw but also saving much waste of the metal to be cut, which, in many cases is of an expensive character, while, because of the decreased width of its cut, the saw can be run with a much less expenditure of power than the thicker saws now used.

Another advantage of my invention is that old and discarded saw blades which were originally provided with integral teeth, but which have been so reduced in diameter by wear as to be unavailable for further use, can be readily and cheaply restored to usefulness by welding teeth thereupon in the manner which I have devised.

I claim:—

1. A metal cutting saw having a body composed of tough metal, provided with separate teeth integrally united to the margin of said body, said teeth being composed of hardened steel of different composition.

2. A metal cutting saw having a body composed of tough metal provided with separate teeth integrally united to separate seats on the margin of said body, said teeth being composed of hardened steel of different composition.

In testimony whereof, I have signed my name to this specification, in the presence of two subscribing witnesses.

WM. H. LUCAS.

Witnesses:
 HAMILTON D. TURNER,
 KATE A. BEADLE.